(12) United States Patent
Vigre

(10) Patent No.: US 8,840,449 B2
(45) Date of Patent: Sep. 23, 2014

(54) FISH PROCESSING MACHINE

(75) Inventor: Kenneth Vigre, Stavanger (NO)

(73) Assignee: Trio Food Processing Machinery AS (NO)

( * ) Notice: Subject to any disclaimer, the term of this patent is extended or adjusted under 35 U.S.C. 154(b) by 0 days.

(21) Appl. No.: 13/810,642

(22) PCT Filed: Jul. 15, 2011

(86) PCT No.: PCT/NO2011/000205
§ 371 (c)(1),
(2), (4) Date: Feb. 6, 2013

(87) PCT Pub. No.: WO2012/011818
PCT Pub. Date: Jan. 26, 2012

(65) Prior Publication Data
US 2013/0210328 A1    Aug. 15, 2013

(30) Foreign Application Priority Data
Jul. 20, 2010   (NO) .................................. 20101031

(51) Int. Cl.
*A22C 18/00* (2006.01)
*A22C 25/08* (2006.01)
(52) U.S. Cl.
CPC ..................................... *A22C 25/08* (2013.01)
USPC ........................................................ 452/185
(58) Field of Classification Search
USPC ......... 452/125–127, 135, 137, 161, 177–180, 452/185; 99/537, 540, 584, 539, 567, 589
See application file for complete search history.

(56) References Cited

U.S. PATENT DOCUMENTS

| | | | |
|---|---|---|---|
| 1,921,440 A | | 8/1933 | Harden |
| 4,186,216 A | * | 1/1980 | Roth .............................. 452/140 |
| 4,649,604 A | * | 3/1987 | Braeger ........................ 452/127 |
| 5,810,652 A | * | 9/1998 | Eide et al. ...................... 452/125 |
| 6,142,862 A | * | 11/2000 | Dalgord et al. ............... 452/137 |
| 7,090,573 B2 | | 8/2006 | Grosseholz et al. |

FOREIGN PATENT DOCUMENTS

| | | |
|---|---|---|
| GB | 1070025 A | 5/1967 |
| GB | 2032246 A | 5/1980 |
| JP | 59-140827 | 8/1984 |
| NO | 133686 B | 8/1975 |
| WO | 9805215 A1 | 2/1998 |
| WO | 9907228 A1 | 2/1999 |

OTHER PUBLICATIONS

International Search Report dated Nov. 10, 2011 from International Patent Application No. PCT/NO2011/000205, filed Jul. 15, 2011 (5 pages).
International Preliminary Report on Patentability and Written Opinion dated Jan. 22, 2013 from International Patent Application No. PCT/NO2011/000205, filed Jul. 15, 2011 (5 pages).
Search Report dated Jan. 22, 2011 from Norwegian Patent Application No. 20101031 filed Jul. 20, 2010 (2 pages).

* cited by examiner

*Primary Examiner* — Richard Price, Jr.
(74) *Attorney, Agent, or Firm* — Sunstone IP

(57) ABSTRACT

A fish processing machine comprising a freeze drum where the freeze drum is designed to be able to receive a fish fillet being fed on to the freeze drum at a feeding area while the freeze drum rotates about its own rotational axis, and where the freeze drum by fixedly freezing is arranged to hold the fish fillet in a fixed position relative to the freeze drum, and where a pressure roller arranged to force the fish fillet against the freeze drum shell is arranged at the feeding area.

9 Claims, 3 Drawing Sheets

FISH PROCESSING MACHINE

Figure 1:
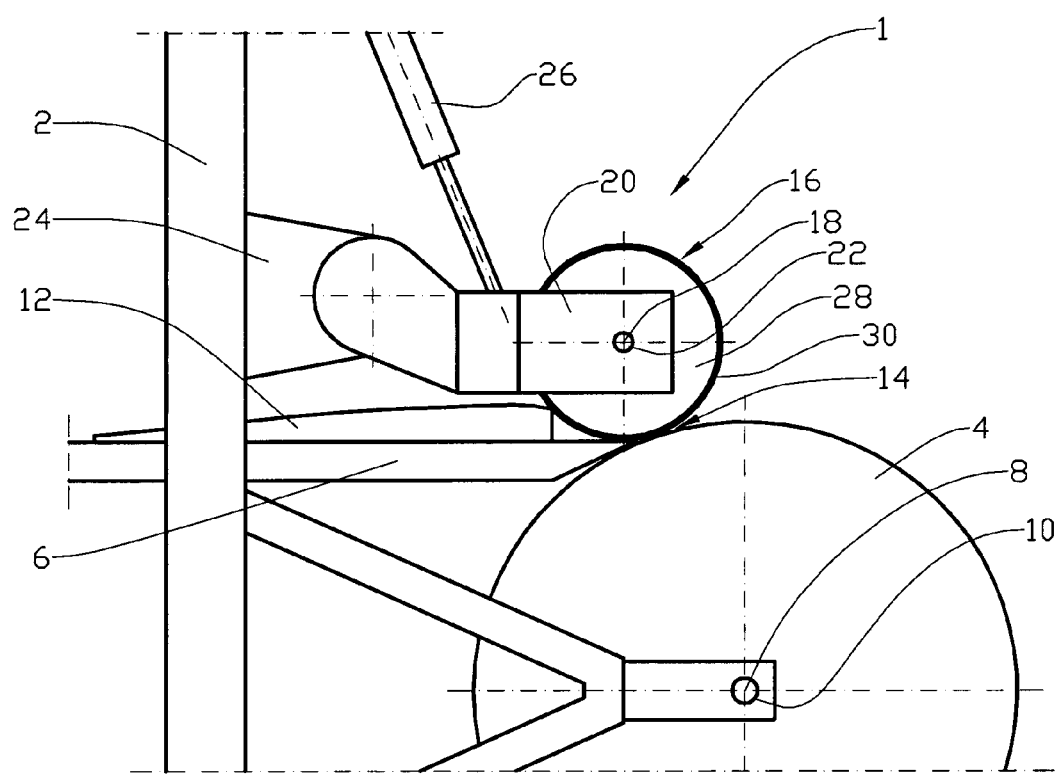

This invention relates to a fish processing machine. More particularly it concerns a fish processing machine comprising a freeze drum where the freeze drum is arranged to be able to receive a fish fillet when the fish fillet is fed on to the freeze drum at a feeding area while the freeze drum is rotating about its own rotational axis, and where the freeze drum, by means of fix-freezing, is arranged to hold the fish fillet in a fixed position relative to the freeze drum.

Fish processing machines comprising a freeze drum for fixedly holding the fish fillet during processing is seeing a considerable use. It has turned out that machines of this kind are particularly well suited for removal of skin and bones from the fish fillet.

According to prior art a fish fillet is fed on to the freeze drum from a feeding device, often in the form of a conveyor. It is common to feed the fish on to the freeze drum with the relatively thin tail end first to secure a good ice-connection between the freeze drum and the fish fillet.

It is important that the fish fillet immediately obtains good contact with the cold freeze drum to achieve a strong ice-connection between them. If the fish fillet is lifted from the freeze drum before the fish fillet freezes fixedly, white frost may form on the freeze drum considerably reducing the strength of the ice-connection between the fish fillet and the freeze drum.

Lately, new processes, such as removal of so-called pin bones, have been developed. It turns out that such processes may be made more efficient if the fish fillet is fed on to the freeze drum with the relatively thick head end of the fish fillet first. This entails that the fish fillet, due to higher stiffness at the head end, often does not get sufficiently into contact with the freeze drum. Known remedies, such as leaf springs forcing the fish fillet against the freeze drum, do not solve the problem in a satisfactory manner.

The object of the invention is to remedy or reduce at least one of the disadvantages of the prior art, or at least to provide a useful alternative to the prior art.

The object is achieved by the features disclosed in the below description and in the subsequent claims.

There is provided a fish processing machine comprising a freeze drum where the freeze drum is arranged to be able to receive a fish fillet being fed on to the freeze drum at a feeding area while the freeze drum rotates about its own rotational axis, and where the freeze drum, by means of fix-freezing, is arranged to be able to hold the fish fillet in a fixed position relative to the freeze drum. The fish processing machine is characterized in that a pressure roller, arranged to force the fillet against the freeze drum shell, is arranged at the feeding area.

The temperature of the freeze drum may be in the range −1 to −30° C., while the temperature of the fish fillet may in the range 1 to 10° C.

The pressure roller is forced against the freeze drum with an adjustable force by means of an actuator, such as one or more pneumatic cylinders. The actuator may be controlled such that the pressure roller is somewhat lifted or unloaded as the fish fillet is moved in under the pressure roller. In a simplified version the actuator may be constituted by a gas spring, or it may be placed in a fixed position relative to the drum.

The rotational axis of the pressure roller is normally parallel to the rotational axis of the freeze drum.

The pressure roller may comprise a shell arranged on a core material. The shell may be smooth and made of a material having good hygienic properties, such as polymerized siloxanes known under the name of silicon. The core material may be foam rubber like and made of an artificial material. There are not the same hygienic requirements to the core material as it does not come into contact with food. For cleaning reasons it is desirable that the core material is formed with closed pores.

Known methods may be used for manufacturing the shell and the core material.

The shell may have a thickness less than 10 mm, but the best result is achieved with a thickness less then 2 mm.

The shell and the core material may have approximately the same hardness. The hardness may be in the range 2 to 40 Shore A depending on the type and size of fish. In processing of, for example, salmon a hardness in the range 5 to 10 Shore A is suitable.

The pressure roller prevents the fish fillet from being lifted up from the freeze drum as the fish fillet comes into contact with the freeze drum. White frost is thereby avoided on the freeze drum due to humidity accompanying the fillet, and a strong and stable ice connection between the fish fillet and the freeze drum is established.

Figure 2:
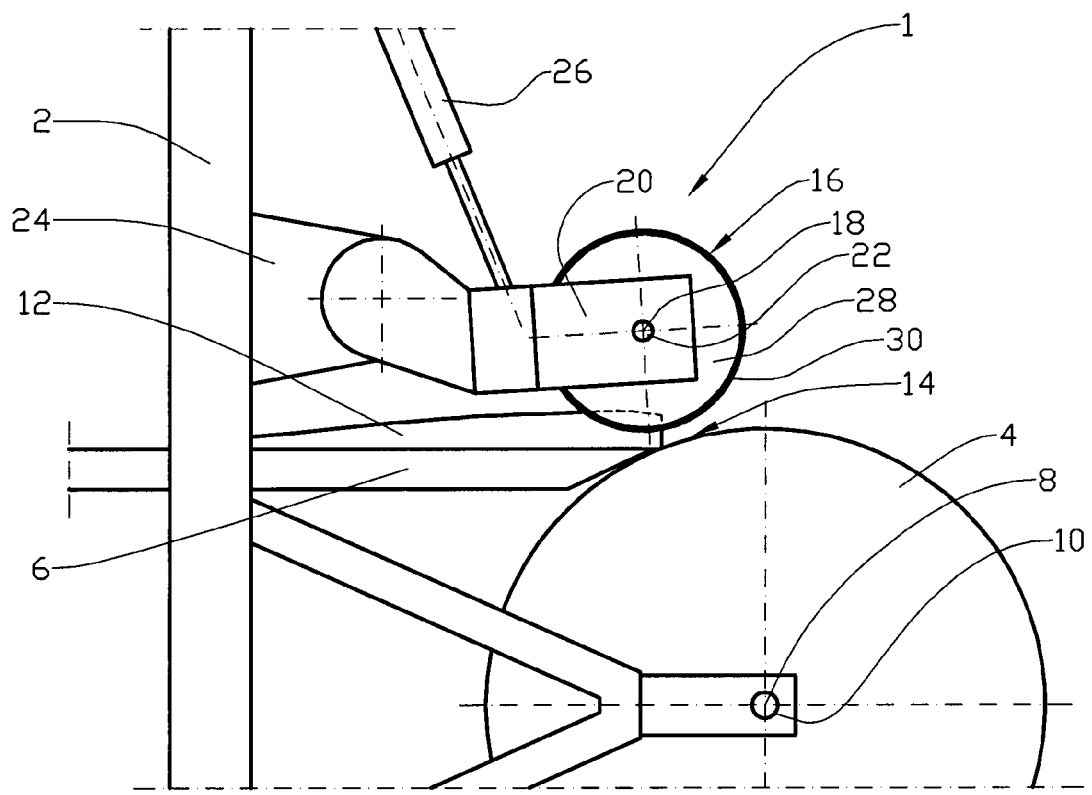
Figure 3:
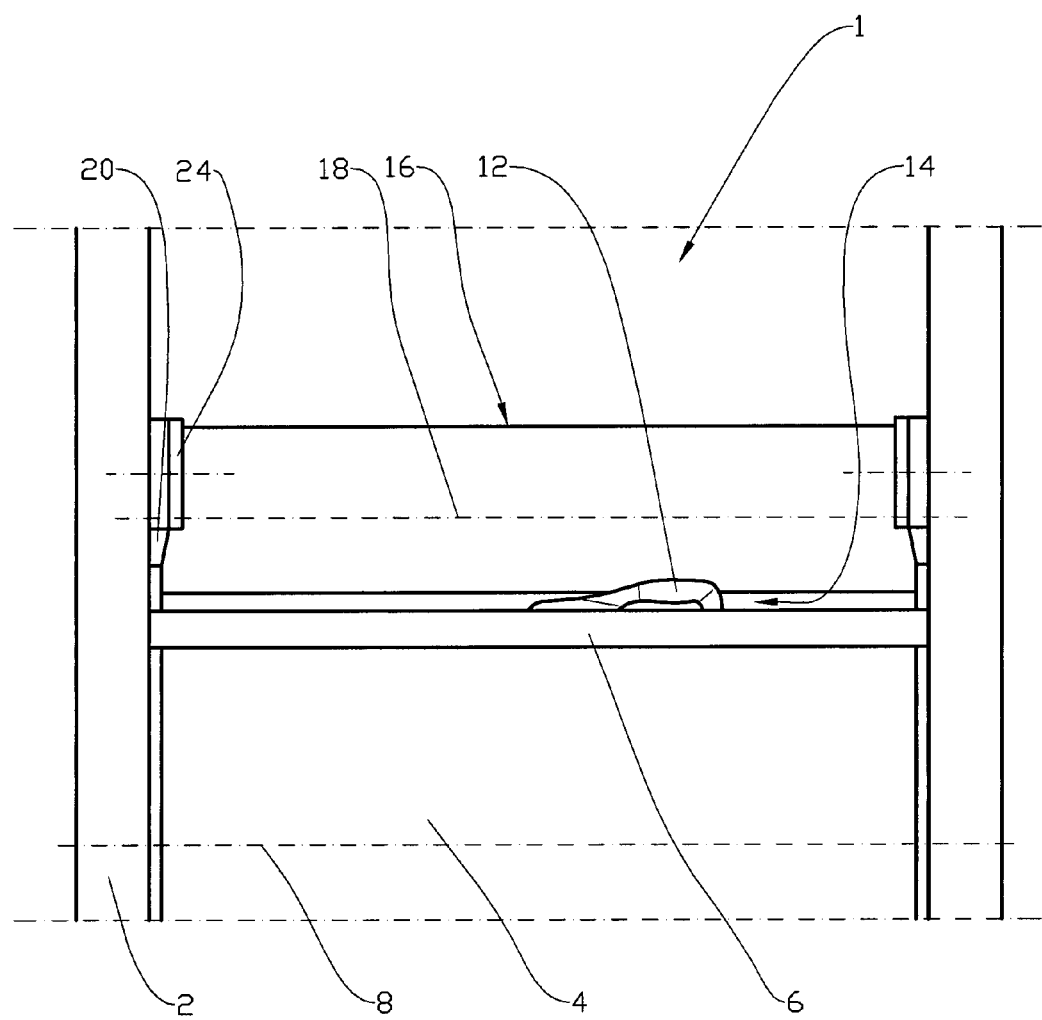

In the following is described an example of a preferred embodiment illustrated in the accompanying drawings, wherein:

FIG. 1 in a side view shows a simplified section of a fish processing machine according to the invention;

FIG. 2 shows the same as in FIG. 1, but a fish fillet is here about to come into contact with the freeze drum; and FIG. 3 shows an end view from the feeding side of the fish-processing machine.

In the drawings the reference numeral 1 indicates a fish processing machine comprising a frame 2, a freeze drum 4 and a feeding table 6. The freeze drum 4, being rotatable about a rotational axis 8, is connected to the frame 2 by means of a shaft 10. The feeding table 6, also being connected to the frame 2, is arranged to be able to feed fish fillets 12 on to the freeze drum 4 in a feeding area 14.

Necessary components, such as drive, cooling machinery and power supply, are not shown, but will be known to a person versed in the art.

A pressure roller 16 having its rotational axis 18 parallel to the freeze drum 4 rotational axis 8 is located at the feeding area 14. The pressure roller 16 is connected to a pivoting frame 20 by means of a shaft 22, as the pivoting frame 20 is pivotally connected to the frame 2 by means of a pivoting attachment 24.

A pair of actuators 26 in the form of pneumatic cylinders, arranged to be able to turn the pivoting frame 20 relative to the pivoting attachment 24, are connected between the pivoting frame 20 and the frame 2.

The pressure roller 16 is constructed from a relatively soft core material 28, e.g. an artificial foamed material being attached to the shaft 22. The core material 28 is surrounded by a relatively soft, flexible, and smooth shell 30.

When a fish fillet 12 is moved on to the feeding table 6 against the freeze drum 4, the fish fillet 12 meets the pressure roller 16, see FIG. 1. During continued displacement of the fish fillet 12 against the freeze drum 4, the pressure roller 16 rolls over the fish fillet 12, whereby the force from the actuators 26, via the pivoting frame 20 and the pressure roller 16, contribute to the fish fillet being forced against the freeze drum 4 and that it immediately freezes on to this when the fish fillet is fed on to the freeze drum.

The pressure roller 16 is deformed to be able to contact the fish fillet 12 in the whole cross direction of the fish fillet 12, even if the fish fillet 12 has uneven thickness. The deformation of the pressure roller 16 is indicated by means of dotted lines in FIG. 2 and shown in FIG. 3.

Depending on the necessary pressure force against the fish fillet 12, the pressure roller 16 is lifted somewhat from the feeding table 6 and the freeze drum 4 when the fish fillet 12 passes under the pressure roller 16. The pressure force against the fish fillet 12 does not have to be so large that the pressure roller 16 is not lifted somewhat by the fish fillet 12 passing under it.

The invention claimed is:

1. A fish processing machine comprising a freeze drum where the freeze drum is arranged to be able to receive a fish fillet being fed on to the freeze drum at a feeding area, while the freeze drum rotates about its own rotational axis, and where the freeze drum, by fix-freezing, is arranged to hold the fish fillet in a fixed position relative to the freeze drum, characterized in that a pressure roller being arranged to force the fish fillet against the freeze drum is arranged at the feeding area.

2. A fish processing machine according to claim 1, characterized in that the rotational axis of the pressure roller is parallel to the rotational axis of the freeze drum.

3. A fish processing machine according to claim 1, characterized in that the pressure roller comprises a shell arranged on a core material.

4. A fish processing machine according to claim 3, characterized in that the shell thickness is less than 10 mm.

5. A fish processing machine according to claim 3, characterized in that the shell thickness is less than 2 mm.

6. A fish processing machine according to claim 3, characterized in that the shell hardness is between 2 and 40 Shore A.

7. A fish processing machine according to claim 3, characterized in that the shell hardness is between 5 and 10 Shore A.

8. A fish processing machine according to claim 3, characterized in that the core material hardness is between 2 and 40 Shore A.

9. A fish processing machine according to claim 3, characterized in that the core material hardness is between 5 and 10 Shore A.

* * * * *